(No Model.) 6 Sheets—Sheet 1.
E. MAERTENS.
FARE REGISTER.
No. 306,629. Patented Oct. 14, 1884.
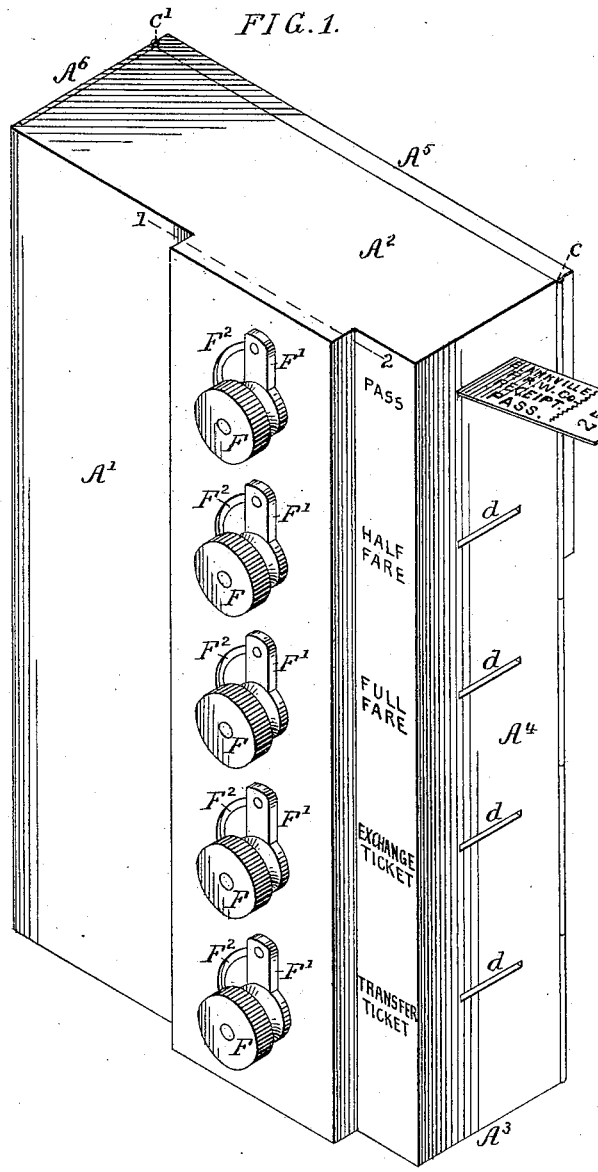
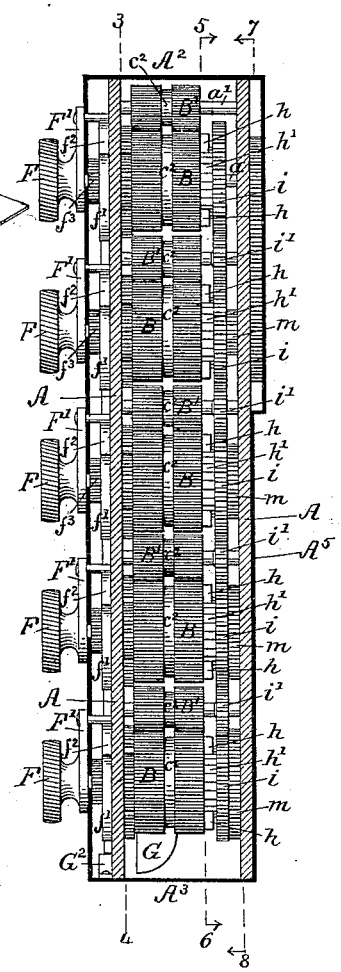
WITNESSES:
John E. Parker
James F. Tobin
INVENTOR:
Emile Maertens
by his Attorneys
Howson & Sons (No Model.)

6 Sheets—Sheet 2.

E. MAERTENS.
FARE REGISTER.

No. 306,629. Patented Oct. 14, 1884.

WITNESSES:
John E. Parker
James F. Tobin

INVENTOR:
Emile Maertens
by his Attorneys
Howson & Sons (No Model.) 6 Sheets—Sheet 3.

E. MAERTENS.
FARE REGISTER.

No. 306,629. Patented Oct. 14, 1884.

WITNESSES:
John E. Parker
James J. John

INVENTOR:
Emile Maertens
by his Attorneys
Howson & Son (No Model.) 6 Sheets—Sheet 4.

E. MAERTENS.
FARE REGISTER.

No. 306,629. Patented Oct. 14, 1884.

WITNESSES:
John E. Parker
James F. Tobin

INVENTOR:
Emile Maertens
by his Attorneys
Howson & Son (No Model.)  6 Sheets—Sheet 5.
E. MAERTENS.
FARE REGISTER.
No. 306,629. Patented Oct. 14, 1884.
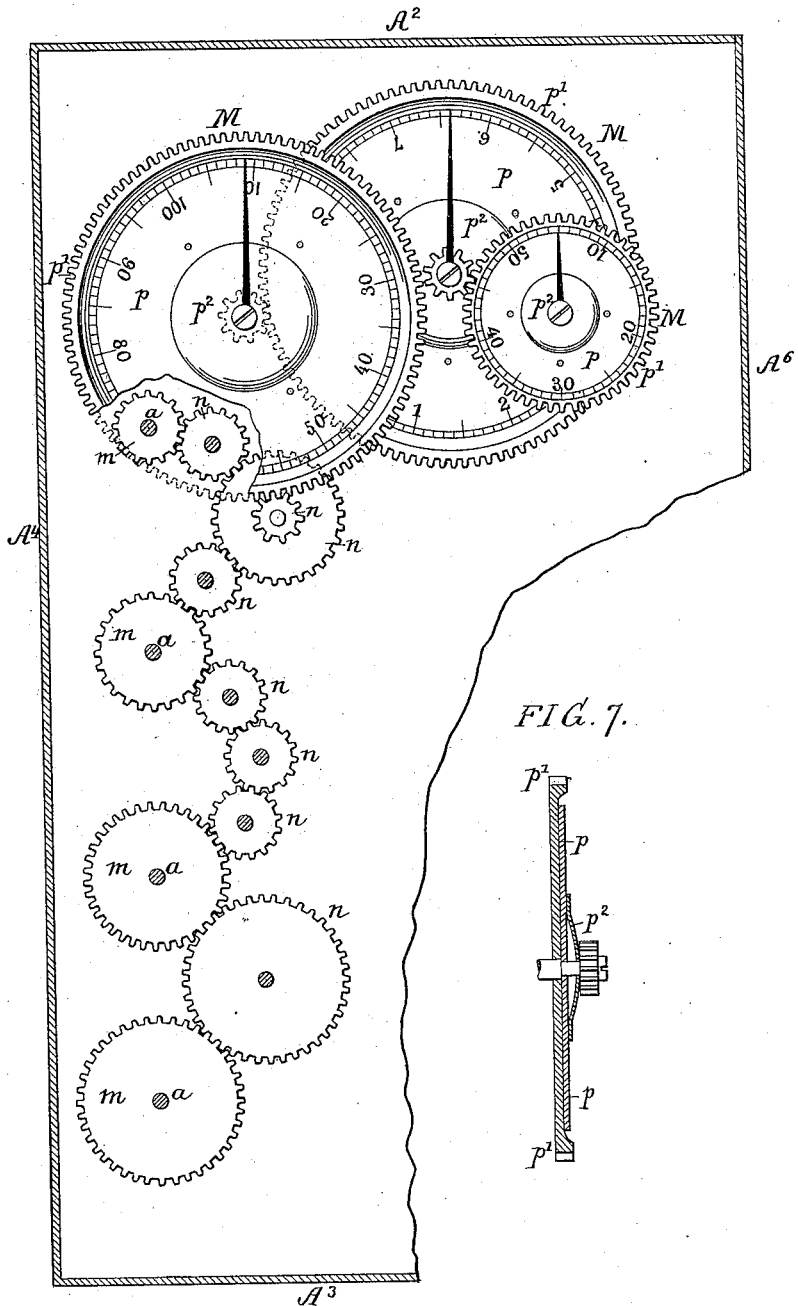
WITNESSES:
John E. Parker
James F. Tobin
INVENTOR:
Emile Maertens
by his Attorneys
Howson & Sons (No Model.)  6 Sheets—Sheet 6.

E. MAERTENS.
FARE REGISTER.

No. 306,629.  Patented Oct. 14, 1884.

WITNESSES:
John E. Parker
James F. Tobin

INVENTOR:
Emile Maertens
by his Attorneys
Howson & Son

UNITED STATES PATENT OFFICE.

EMILE MAERTENS, OF PHILADELPHIA, PENNSYLVANIA.

FARE-REGISTER.

SPECIFICATION forming part of Letters Patent No. 306,629, dated October 14, 1884.

Application filed October 18, 1883. (No model.)

*To all whom it may concern:*

Be it known that I, EMILE MAERTENS, a citizen of the United States, and a resident of Philadelphia, Pennsylvania, have invented certain Improvements in Fare-Registers, of which the following is a specification.

The object of my invention is to construct a fare-register which will provide an effectual check upon dishonesty on the part of the person collecting the fares.

My improvements consist of certain combinations of registering-gearing and certain details of construction of the same, fully described and claimed hereinafter.

Figure 3:
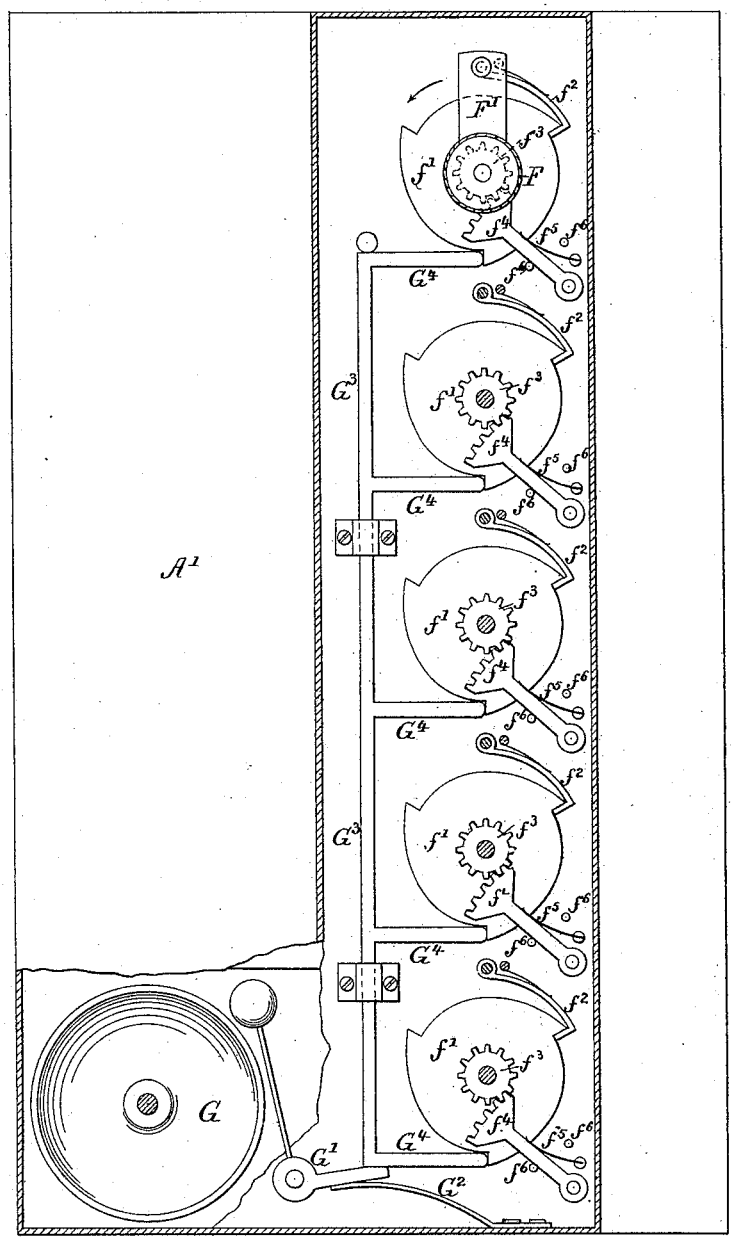
Figure 4:
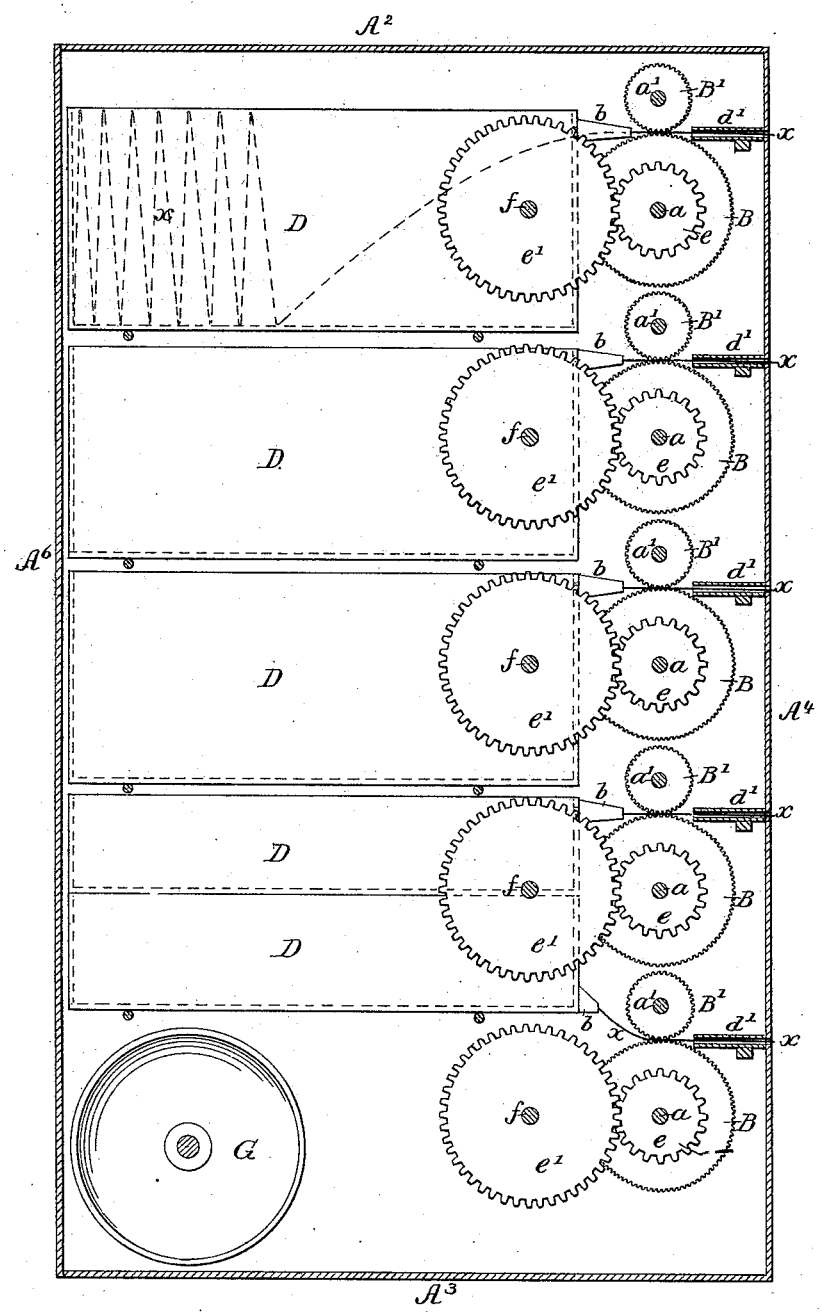
Figure 5:
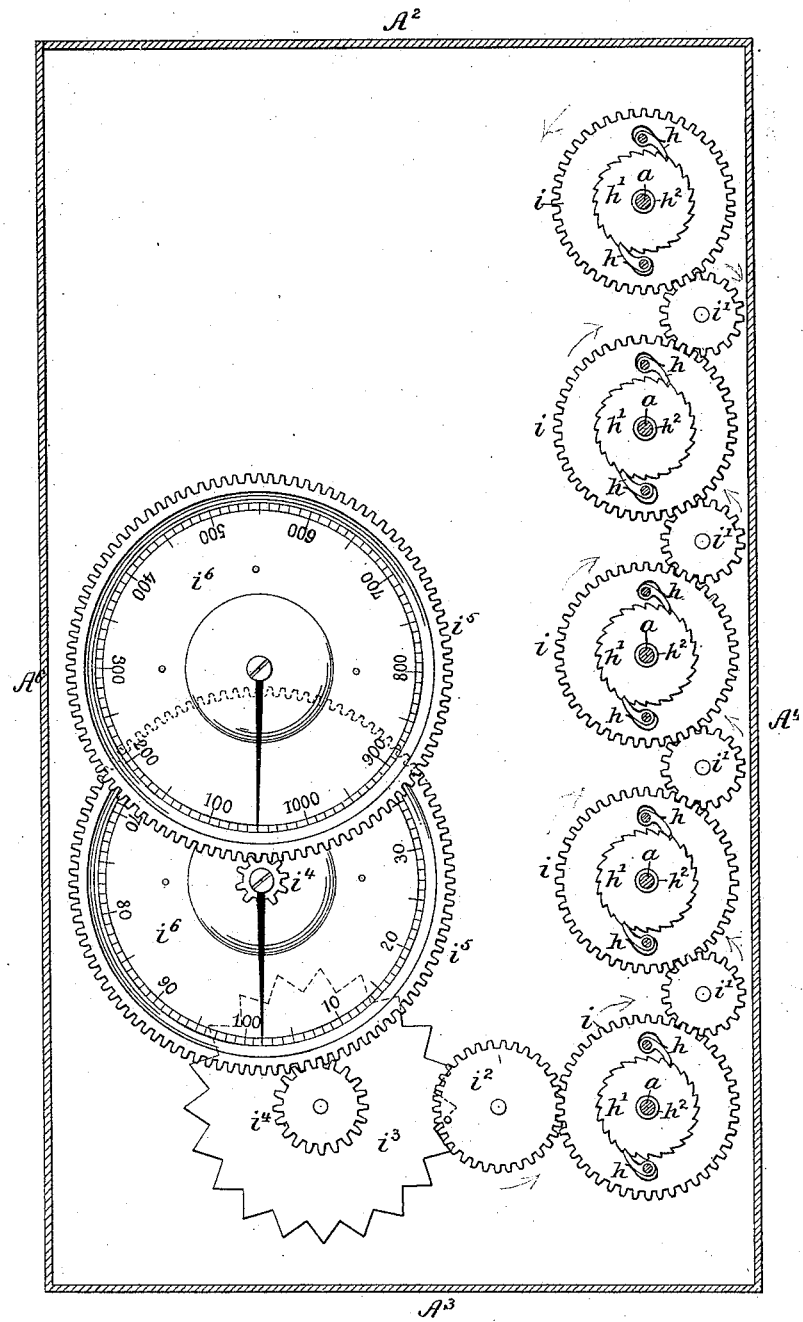
Figure 8:
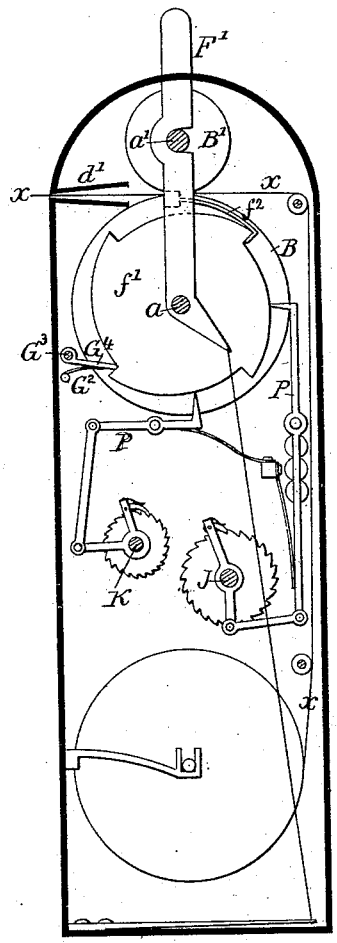
Figure 9:
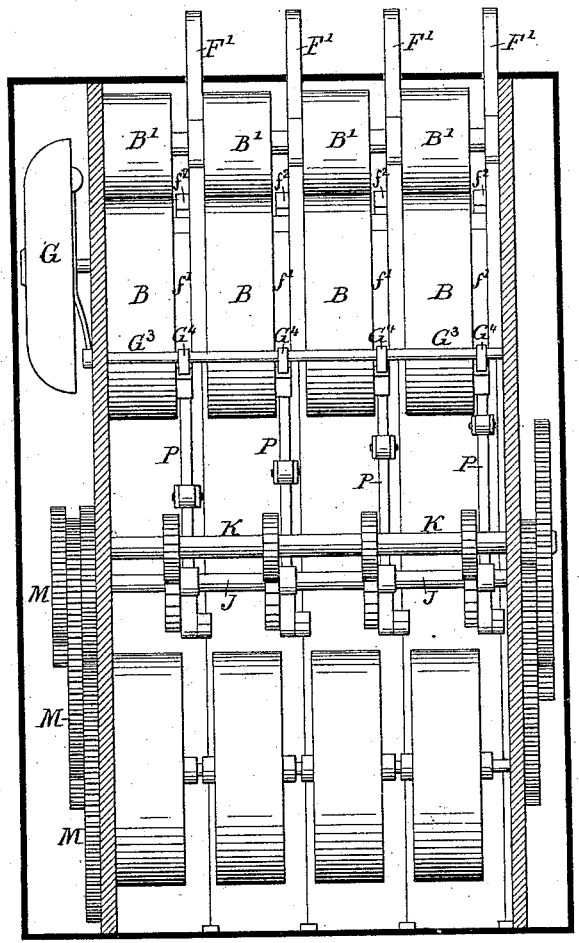

In the accompanying drawings, Figure 1, Sheet 1, is a perspective view of my improved fare-register; Fig. 2, a front view of the same with the case in section; Fig. 3, Sheet 2, a section on the line 1 2, Fig. 1; Fig. 4, Sheet 3, a section on the line 3 4, Fig. 2; Fig. 5, Sheet 4, a section on the line 5 6, Fig. 2; Fig. 6, Sheet 5, a section on the line 7 8, Fig. 2; Fig. 7, a detached section of part of the registering mechanism; and Figs. 8, 9, 10, and 11, Sheet 6, views illustrating modifications of my invention.

A is the frame of the device, secured to which, near the front end, are a series of transverse shafts, $a$ $a'$, carrying-drums B B'; and supported in the frame, back of each pair of drums B B', is a box or tray, D, containing a folded strip, $x$, of paper, and having a mouth, $b$, so arranged in respect to the pair of drums that the strip of paper on issuing from the mouth will pass between said drums, the surfaces of which are preferably roughened or corrugated so as to take a firm hold upon the strip. (See Figs. 2 and 4.) The frame is contained within a casing of which one side, A', the top $A^2$, bottom $A^3$, and front $A^4$ are secured together and to the frame, the remaining side, $A^5$, being hinged to the front at $c$, and the rear $A^6$ hinged to the side $A^5$ at $c'$, so that the back and one side of the casing can be opened and ready access to any part of the frame A and the parts carried thereby thus insured. In the front $A^4$ of the casing are a series of slots, $d$—one for each pair of drums B B'—and inside the casing are guides $d'$, through which the front ends of the strips $x$ pass on issuing from between the drums. On rotating or partially rotating any of the pairs of drums shown, the strip controlled by said pair of drums will be fed forward, and a portion of said strip caused to pass through the guide $d'$ and slot $d$ and project beyond the casing. Each strip $x$ represents a certain class of fare, and the strips may be of different colors, and may have printed upon them the name of the company, the number of the car, the date, and such other information as may be desirable. As shown in the drawings, there are five strips representing, respectively, a pass, a half-fare, a full fare, an exchange-ticket, and a transfer-ticket, and it is the duty of the collector on receiving a fare to operate one of the pairs of drums B B', so as to cause the projection from the case of a portion of the strip corresponding to the class of fare received, the projecting portion of the strip being torn off and given to the passenger as a receipt for his fare. Each of the drums B B' has a central groove, $c^2$, so that an opening is formed, through which a suitable instrument can be inserted for grasping the front end of the strip $x$ and drawing it between the drums when the register is being prepared for action.

Various devices may be used for effecting the rotation or partial rotation of the feed-drums B B', the devices which I prefer to use being shown in Figs. 1 to 4.

On the shaft $a$ of each drum B is a spur-pinion, $e$, Fig. 4, which gears into a spur-wheel, $e'$, on a short shaft, $f$, carried by the frame A. Secured to this shaft is a ratchet-wheel, $f'$, Fig. 3, and on the end of the shaft, outside of the casing, is hung a knob, F, having an arm, F', a pin on which projects through a slot, $F^2$, in the casing and carries a spring-pawl, $f^2$, adapted to engage with the teeth of the ratchet-wheel $f'$.

On the shaft $f$ is a spur-wheel, $f^3$, which gears into a segmental rack on a pivoted arm, $f^4$, acted on by a spring, $f^5$, and limited in its movement by stop-pins $f^6$, Fig. 3. The arm F' and wheel $f'$ can be turned in the direction of the arrow until the arm $f^4$ strikes one of these stop-pins, and upon releasing the knob F the spring $f^5$, acting on the arm $f^4$, will effect a reverse movement of the arm F', until the arm $f^4$ is arrested by the other stop-pin, this movement being sufficient to cause the pawl $f^2$ to engage with another tooth of the wheel $f'$. Each movement of the parts as thus limited causes the projection from the casing of the proper length of the strip $x$, which is being acted upon.

It is usual in fare-registers to sound an alarm upon the collection of each fare, and in order to accomplish this I place in the lower portion of the box a bell, G, the pivoted hammer-lever G' of which is acted upon by a spring, $G^2$, and also by the lower end of a guided bar, $G^3$, which has a series of arms, $G^4$, projecting beneath and bearing upon the ratchet-wheels $f'$, so that on the operation of either one of these wheels a tooth of the same will depress the bar $G^3$ and draw back the hammer-lever; but as soon as the arm $G^4$ passes from under the control of the tooth there will be a sudden elevation of the bar, and a sudden stroke of the hammer upon the gong under the action of the spring $G^2$. The arms $G^4$ also serve as retaining-pawls to prevent any back movement of the strip-feeders, and as the gong is not sounded until the ratchet has made its proper movement and is locked, there must necessarily be the desired operation of the strip-feeder and registering devices for each fare. Each of the strips $x$ should carry consecutive numbers, so that they will serve as a registry of the number of fares of each class received; but, in addition to this, I prefer to combine with the strip-feeding rolls registering mechanism to indicate both the number of fares received and the amount of cash received, these two registers being a check upon each other, and the registry by the strips a check upon both.

The mechanism for registering the aggregate number of fares received, or, rather, the aggregate number of passengers carried, (passes being registered as well as fares,) is shown in Figs. 2 and 5.

On one end of each drum B are hung two spring-pawls $h$, which engage with the teeth of a ratchet-wheel, $h'$, secured to a sleeve, $h^2$, which can turn freely on the shaft $a$, and to which is also secured a spur-wheel, $i$. (See Fig. 5.) These wheels $i$ are geared together by intermediate pinions, $i'$, hung to studs on the frame A, and the last or bottom wheel, $i$, of the series is connected to the first of a train of wheels constituting registering mechanism, which may be of any desired character, that shown comprising a pin-wheel, $i^2$, star-wheel $i^3$, pinions $i^4$, spur-wheels $i^5$, and registering-disks $i^6$. The operation of any one of the drums B will thus cause an operation of the registering mechanism to the extent necessary to indicate one passenger, so that the number of strip-receipts delivered in any given time must correspond with the number indicated by the register during that period.

The mechanism for indicating the amount of cash received is shown in Figs. 2 and 6.

To the sleeve $h^2$, on the shaft $a$ of each of the strip-feeding devices, except that for the pass-strip, is secured a pinion, $m$, and these pinions are connected by a series of intermediate wheels, $n$, to the first of a series of registering-wheels, M, so that the movement of any one of the pinions $m$ will cause a movement of the registering mechanism. Each of the drums B is moved to the same extent in registering a fare; but to register the amount of fare received it is necessary that the registering mechanism be moved to a different extent for each class of fare, the movement being proportionate to the amount of fare; hence I make the pinions $m$ of different sizes, as shown in Fig. 6. Thus each cent of fare may be represented by four teeth of the pinion, the half-fare pinion having, say, sixteen teeth, the full-fare pinion twenty-four teeth, the exchange-ticket pinion thirty-six teeth, and the transfer-ticket pinion forty teeth.

I prefer to construct each of the registering-wheels as shown in Fig. 7, the graduated disk $p$ being loose on the shaft which carries the spur-wheel $p'$, but being pressed against the face of the said wheel by springs or by an elastic disk, $p^2$, so as to provide a frictional connection between the wheel and disk, whereby the disk can be set without necessitating any movement of the train of registering-wheels, the friction between the wheel and disk being such, however, that the turning of the disk with the wheel will be insured.

Various modifications in the construction of the different parts of the register may be made within the scope of my invention. For instance, in Figs. 8 and 9, Sheet 6, I have shown a form of apparatus embodying the general features of the invention, but modified in detail. In this case the pairs of drums B B' are arranged side by side, and the strips $x$ are drawn from rolls, the pawl-carrying arms or levers projecting through slots in the casing, and being operated directly instead of by means of knobs.

The bar $G^3$ which operates the bell-hammer is a rocking instead of a sliding bar, and the bell is at the side of the case. These changes are all unimportant, being mainly changes of position; but the registering mechanism is materially modified, and comprises two registering-shafts, J and K, the first for cash and the other for fares, each shaft carrying as many ratchet-wheels as there are strip-feeding devices. Each wheel of each shaft is operated by a pawl carried by one arm of a lever hung to the shaft, the other arm of the lever being connected to a lever, P, which is acted upon by one of the ratchets $f'$ of the strip-feeding devices.

The levers P, which operate the wheels of the fare-registering shaft K, are alike; but the levers P, which operate the wheels of the shaft J, differ from each other as regards the relative length of their arms, so that each will impart to the shaft J a movement different from that imparted by the others, but proportionate to the class of fare which it represents.

This differential-lever mechanism I therefore consider to be the equivalent of the differential spur-wheel arrangement shown in Fig. 6, and to be included in the general term "differential gearing."

Figure 10:
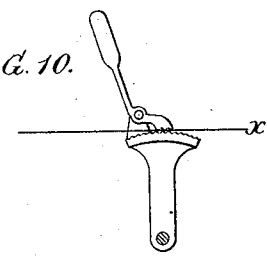
Figure 11:
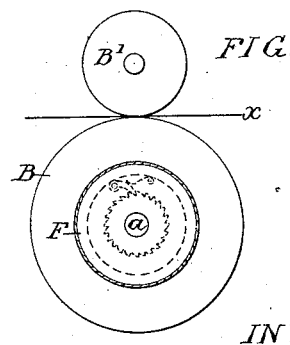

The registering devices shown and described may be used, if desired, without the strip-feeding devices, the arms or knobs being manipulated to operate the registering devices and sound the alarm, and pull or push rods sliding in a straight line may be substituted for vibrating arms, if desired. Strip-feeding devices different from those shown may also be adopted. For instance, an arm or slide having a clamp adapted to clutch the strip on the forward movement and release it on the backward movement, as shown in Fig. 10, may be used; or, where the drums B B' are used, knobs hung directly to the shafts $a$ and having pawls adapted to ratchet-wheels on said shafts, as shown in Fig. 11, may be substituted for the operating mechanism shown, and any desired number of strip-feeders may be used, as circumstances may suggest.

If desired, the differential gearing connecting the strip-feeders and the cash-register may be dispensed with, the movements imparted to the arms or other strip-feeding devices being different in extent, and the movement of each arm being proportionate to the class of fare which it represents, in which case plain connecting-gearing, similar to that used for operating the fare-register, may be employed for the cash-register as well. The construction of the device as shown in Figs. 1 to 6 of the drawings, is, however, preferred.

Suitable openings covered with glass or other transparent material may be made in the casing, so as to permit the inspection of the registering-disks without the necessity of opening the casing.

I claim as my invention—

1. A fare-register in which a slotted case containing a paper strip is combined with mechanism for feeding said strip, an alarm-gong, its hammer-lever, and a bar, $G^3$, acting upon the said lever, and having an arm, $G^4$, bearing upon a ratchet-wheel forming part of the strip-feeding mechanism, and serving to prevent backward movement of said wheel, as set forth.

2. A fare-register in which a slotted case containing a series of paper strips—one for each class of fare—is combined with devices whereby the end of any one of said strips can be projected from the case, and with registering mechanism and intermediate gearing, substantially as described, whereby said mechanism is operated by the movement of any one of said strip-feeding devices, as set forth.

3. A fare-register in which a series of arms or equivalent devices, as described—one for each class of fare—is combined with two registering devices, and with two sets of gearing, one set uniform and one set differential, whereby each arm is caused to exercise over one registering device a control similar to that of each of the other arms, and over the other registering device a control different from that of each of the other arms, as set forth.

In testimony whereof I have signed my name to this specification in the presence of two subscribing witnesses.

EMILE MAERTENS.

Witnesses:
 JOHN E. PARKER,
 HARRY SMITH.